United States Patent
Magyar et al.

(10) Patent No.: US 10,805,284 B2
(45) Date of Patent: Oct. 13, 2020

(54) FEDERATED LOGIN FOR PASSWORD VAULT

(71) Applicant: LogMeIn, Inc., Boston, MA (US)

(72) Inventors: Gyula Magyar, Budapest (HU); Kornel Pal, Budapest (HU); Joseph Louis Siegrist, Vienna, VA (US); Robert Billingslea, Haymarket, VA (US)

(73) Assignee: LogMeIn, Inc., Boston, MA (US)

( * ) Notice: Subject to any disclaimer, the term of this patent is extended or adjusted under 35 U.S.C. 154(b) by 221 days.

(21) Appl. No.: 16/033,604

(22) Filed: Jul. 12, 2018

(65) Prior Publication Data
US 2019/0020646 A1    Jan. 17, 2019

Related U.S. Application Data (60) Provisional application No. 62/531,496, filed on Jul. 12, 2017.

(51) Int. Cl.
| | |
|---|---|
| *H04L 29/06* | (2006.01) |
| *H04L 9/08* | (2006.01) |
| *H04L 9/32* | (2006.01) |
| *G06F 21/46* | (2013.01) |
| *H04L 9/06* | (2006.01) |
| *G06F 21/41* | (2013.01) |
| *H04W 12/06* | (2009.01) |

(52) U.S. Cl.
CPC ......... *H04L 63/0815* (2013.01); *G06F 21/41* (2013.01); *G06F 21/46* (2013.01); *H04L 9/0643* (2013.01); *H04L 9/0861* (2013.01); *H04L 9/0894* (2013.01); *H04L 9/3218* (2013.01); *H04L 9/3228* (2013.01); *H04L 63/10* (2013.01); *H04W 12/0608* (2019.01)

(58) Field of Classification Search
None
See application file for complete search history.

(56) References Cited

U.S. PATENT DOCUMENTS

| | | | |
|---|---|---|---|
| 6,182,214 B1 * | 1/2001 | Hardjono | H04L 9/085 380/255 |
| 8,813,203 B2 | 8/2014 | Anderson | |
| 9,330,245 B2 | 5/2016 | Maron | |
| 9,531,714 B2 | 12/2016 | Innes et al. | |
| 2012/0179916 A1 * | 7/2012 | Staker | G06F 21/53 713/189 |
| 2013/0212393 A1 * | 8/2013 | D'Souza | H04L 9/085 713/171 |
| 2016/0094543 A1 | 3/2016 | Innes et al. | |
| 2016/0191499 A1 * | 6/2016 | Momchilov | H04L 9/0822 713/171 |
| 2017/0272209 A1 * | 9/2017 | Yanovsky | H04L 67/1097 |
| 2017/0331801 A1 | 11/2017 | Mezei et al. | |

* cited by examiner

*Primary Examiner* — Shin-Hon (Eric) Chen
(74) *Attorney, Agent, or Firm* — BainwoodHuang (57) ABSTRACT

A technique for providing federated login to a password vault generates a master password for a federated user, renders the master password as multiple parts, and stores the key parts in separate entities. After successful authentication with an identity provider (IDP), a user's local machine receives the password parts and combines them to recreate the master password. The local machine then applies the master password to decrypt the password vault.

20 Claims, 7 Drawing Sheets

Tab opened by extension

FEDERATED LOGIN FOR PASSWORD VAULT

CROSS-REFERENCE TO RELATED APPLICATIONS

This application claims the benefit of U.S. Provisional Application No. 62/531,496, filed Jul. 12, 2017, the contents and teachings of which are incorporated by reference herein in their entirety.

BACKGROUND

Password managers have become popular software products for storing user passwords and other information that users wish to protect. A conventional password manager controls access to a password vault using a master password, which a user must enter in order to view or modify contents of the password vault. In some cases, the password vault is encrypted and the master password acts as a decryption key for unlocking the password vault. The password vault cannot be unlocked unless the user enters the correct master password. An example of a popular password vault is the LastPass password manager, which is available from LogMeIn, Inc. of Boston, Mass.

Some password managers store encrypted password vaults on a server, which may run on a local network or in the cloud. When a user wishes to access a network-hosted password vault, the user may enter the master password for that vault in a login screen, e.g., of a local app or browser, which encrypts the master password and sends it to the server. The server, which has previously been provisioned with an encrypted version of the same master password, compares the received version of the master password with the previously-stored version. If the two versions match, the server sends the password vault back to the user machine (e.g., app or browser), which applies the master password to decrypt the vault, allowing the user to access the vault's contents. If the two versions do not match, the server refuses the access request and no password vault is returned.

Skilled practitioners sometimes refer to password managers of this kind as "zero knowledge," as knowledge of the master password is not known to any software component, other than those on the user machine that receives the user's typed password (and then, only transiently). The server may store an encrypted version of the master password, but this provides no direct knowledge of the master password itself.

SUMMARY

Organizations increasingly request "federated services" for user management. With federated services, a single sign-on (SSO) to an identity provider, or "IDP," provides user access to multiple software products at once, without requiring separate logins for each product. Federated services are usually easier for administrators to manage than are separate accounts for each product. For example, an administrator can create or disable a user's access to many software products at once, just by changing that user's settings in the IDP.

Unfortunately, federated services have proven difficult to implement for password managers without sacrificing security. For example, federated services normally require passwords to be stored in a third-party IDP, such as Microsoft Active Directory (AD). Storing the master password of a vault in an IDP would violate the zero-knowledge principle, however, as the IDP would have complete knowledge of the master password. This arrangement is vulnerable to attack, as access by malicious users to the IDP could expose all of the secrets contained in any vault stored in the IDP.

Some providers have made attempts at federated login solutions, but these solutions are not secure over the Internet without extra services, such as VPNs (virtual private networks). These extra services may be burdensome for both users and administrators, however.

In contrast with prior approaches, an improved technique for providing federated login to a password vault generates a master password for a federated user, renders the master password as multiple parts, and stores the parts in separate entities. After successful authentication with an identity provider (IDP), a user's local machine receives the password parts and combines them to recreate the master password. The local machine then applies the master password to decrypt the password vault.

Other than the user machine, no single component has all the necessary information to recreate the master password, thereby preserving zero-knowledge features. From the security point of view, re-creation of the master password on the user's machine is similar to a user typing a master password into a login screen. Users enjoy the convenience of SSO, and administrators enjoy the ability to manage user access across an organization from a single location. The improved technique is also suitable for deployment over the Internet, without requiring VPNs. Indeed, one or more of the entities that store the key parts may be connected to the Internet outside the organization's network. Rather than relying on VPNs for security, embodiments of the improved technique benefit from dispersion of multiple key parts to different locations, as well as from secure protocols that maintain zero-knowledge features.

Certain embodiments are directed to a method of managing federated login to a password vault. The method includes sending, by a client machine, an access request to an identity provider (IDP) that runs on a server machine separate from the client machine and provides federated login services for multiple software products. The access request specifies access to a password vault of a user of the client machine. The IDP has stored therein a first key part, K1, for reconstituting a master password that unlocks the password vault. K1 itself is insufficient for unlocking the password vault, however. After sending the access request and in response to successful authentication of the user by the IDP, the client machine (i) receives K1 from the IDP and (ii) requests a set of one or more additional key parts stored on one or more respective other server machines accessible to the client machine over a computer network. Each of the set of one or more additional key parts itself is insufficient for unlocking the password vault. After receiving the set of one or more additional key parts, the client machine (i) reconstitutes the master password by combining K1 and the set of one or more additional key parts and (ii) unlocks the password vault using the reconstituted master password. The unlocked password vault provides the user with access to secrets stored within the password vault.

Other embodiments are directed to a client machine constructed and arranged to perform a method of managing federated login to a password vault, such as the method described above. Still other embodiments are directed to a computer program product. The computer program product stores instructions which, when executed on control circuitry, cause the control circuitry to perform a method of managing federated login to a password vault, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for providing federated login to a password vault generates a master password for a federated user, renders the master password as multiple parts, and stores the parts in separate entities. After successful authentication with an identity provider (IDP), a user's local machine receives the password parts and combines them to recreate the master password. The local machine then applies the master password to decrypt the password vault.

Figure 1:
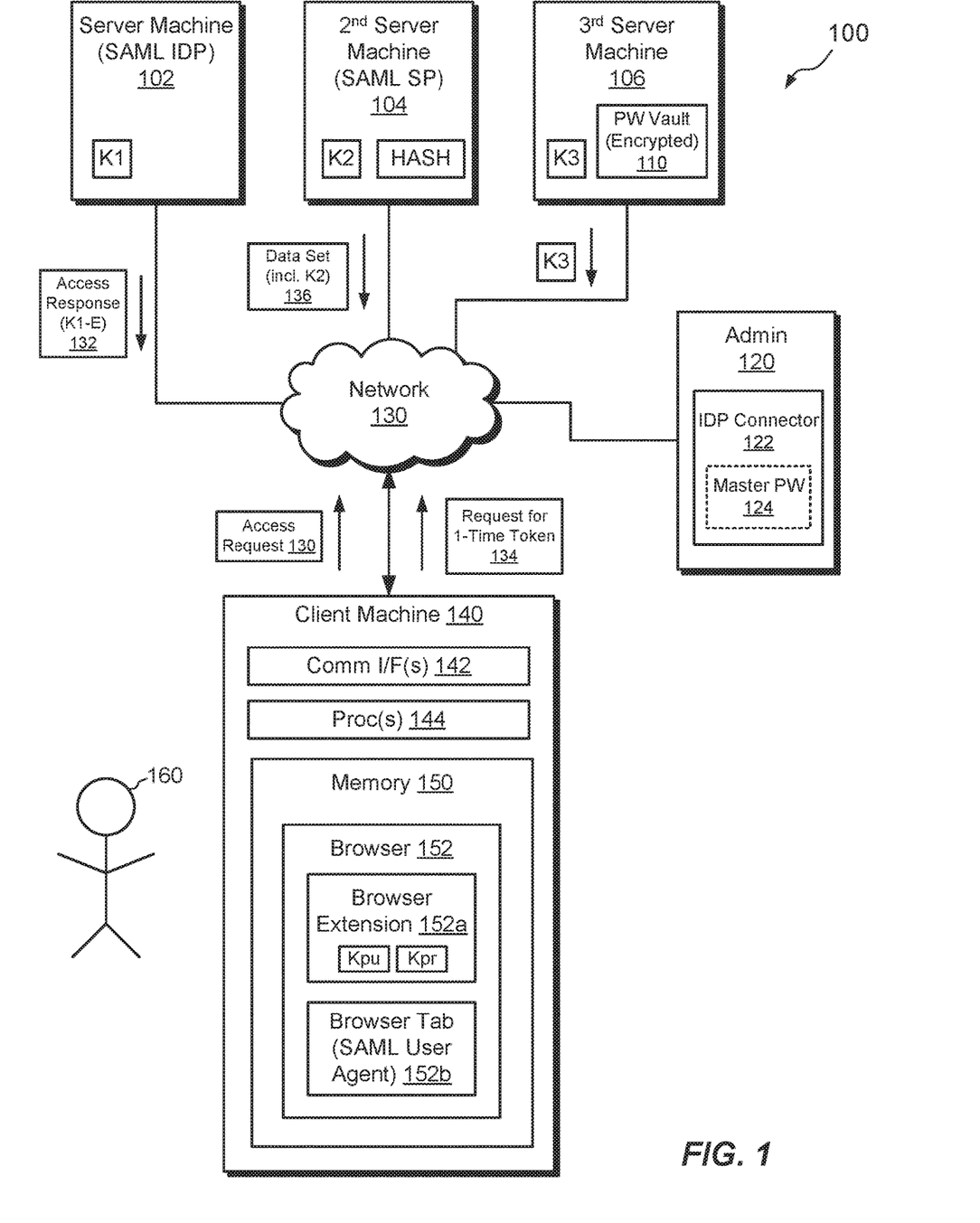
FIG. 1 is a block diagram of an example environment in which embodiments of the invention can be practiced.

FIG. 1 shows an example environment 100 in which embodiments of the improved technique hereof can be practiced. Here, a server machine 102, a second server machine 104, and a client machine 140 are all connected to a computer network 130. Optionally, a third server machine 106 and an administrative machine 120 are also connected to the network 130. The server machine 102 is configured as an identity provider (IDP), and the second server machine 104 is configured as a service provider (SP), such as a service provider for password management account services. In an example, the third server machine 106 is configured as a password-management server and stores a password vault 110, which can be decrypted using a master password 124. In a non-limiting example, in which federated login is provided for LastPass, the second server machine 104 may be realized as a webserver and database for accounts.lastpass.com, and the third server machine 106 may be realized as a webserver and database for lastpass.com.

The network 130 may be any type of network or combination of networks, such as a local area network (LAN), a wide area network (WAN), the Internet, and/or some other type of network or combination of networks, for example. In some examples, the network 130 includes both the public Internet and an enterprise network, i.e., a network operated by the entity that provides the federated login services. In such cases, the client machine 140 and one or more of the server machines 104 and 106 may be located on the public Internet, whereas the server machine 102 may be located within the enterprise network.

The client machine 140 may be any type of computing machine that can run software and communicate over the Internet, such as a desktop computer, laptop computer, smart phone, tablet computer, set-top box, gaming system, or the like. As shown, the client machine 140 includes one or more communication interfaces 142, a set of processors 144, and memory 150. The communication interfaces 142 include, for example, network interface adapters for converting electronic and/or optical signals received over the network 130 to electronic form for use by the client machine 140. The set of processors 144 includes one or more processing chips and/or assemblies. The memory 150 includes both volatile memory, e.g., Random Access Memory (RAM), and non-volatile memory, such as one or more ROMs (Read-Only Memories), disk drives, solid state drives, and/or the like. The set of processors 144 and the memory 150 together form control circuitry, which is constructed and arranged to carry out various methods and functions as described herein. Also, the memory 150 includes a variety of software constructs realized in the form of executable instructions. When the executable instructions are run by the set of processors 144, the set of processors 144 carry out the operations of the software constructs. Although certain software constructs are specifically shown and described, it is understood that the memory 150 typically includes many other software constructs, which are not shown, such as an operating system, various applications, processes, and daemons.

As further shown in FIG. 1, the memory 150 "includes," i.e., realizes by execution of software instructions, a web browser 152. The web browser 152 is configured with a browser extension 152a and is capable of opening browser tabs, such as browser tab 152b.

Although not shown, one should appreciate that the server machines 102, 104, and 106 each include respective network interfaces, processors, and memory. The server machines 102, 104, and 106 may be implemented using physical computers, virtual machines, or any combination of physical and virtual machines.

As shown, the master password 124 is rendered as multiple password parts, all of which are required to decrypt the password vault 110 but none of which is capable of decrypting the password vault 110 individually. Three password parts, K1, K2, and K3, are specifically shown. For proper operation, the master password 124 should be rendered with a minimum of two password parts, and any number of passwords parts greater than one is permitted.

As further shown, K1 is stored in the server machine 102, K2 is stored in the second server machine 104, and K3 is stored in the third server machine 106. In the illustrated example, all three key parts K1, K2, and K3 are required to decrypt the password vault 110.

In an example, the environment 100 employs a cloud-based identity solution for supporting federated login. Example cloud-based solutions include SAML (Security Assertion Markup Language), such as SAML 2.0, Google's G Suite, or Microsoft's Azure ID. When using SAML, the server machine 102 may be configured as a SAML identity provider (IDP), the second server machine 104 may be configured as a SAML service provider (SP), and the client machine 140 may be configured as a SAML user agent. The server machine 102 may be configured with a variety of IDPs. In a particular example, the IDP is implemented with Microsoft's Active Directory Federated Services (ADFS). Other IDPs may be used, however, including other third-party IDPs and custom-built IDPs.

In an example, the administrative machine 120 runs an IDP connector 122. The IDP connector 122 integrates with the IDP (e.g., ADFS) and synchronizes user information between the IDP and the service provider. In a particular example, the IDP connector 122 is configured to generate the master password 124, render the master password 124 as password parts (e.g., K1, K2, and K3), and securely place the password parts in their illustrated locations, i.e., with K1 stored on the server machine 102, K2 stored on the second server machine 104, and K3 stored on the third server machine 106. After rendering the master password as password parts, the IDP connector 122 preferably destroys the master password 124, as well as the password parts that have been stored elsewhere, so as to preserve zero knowledge. With the password parts stored in their respective locations, no single component has all the password parts needed to unlock the password vault 110. In some examples, the IDP connector 122 generates a forward-secure hash value from K1 and K2, such as SHA256 (K1 XOR K2), and provisions the hash value (HASH) to the second server machine 104. As the hash value reveals nothing about K1, K2, or K1 XOR K2, the hash value by itself provides no useful knowledge.

In some examples, the administrative machine 120 includes configuration software for performing additional provisioning and setup operations. These operations may include, for example, providing each of the server machines 102, 104, and 106 with an internet address (e.g., URL— Uniform Resource Locator) of each of the other server machines, to support communication among the server machines.

In example operation, which is intended to be merely illustrative, a user 160 attempts to log on to a password manager using federated login. The user operates the client machine 140 and opens the web browser 152. The user 160 then opens the browser extension 152a within the web browser 152. After entering identifying information, such as the user's email address, into a form of the browser extension 152a, the browser extension 152a starts a federated login sequence, e.g., in response to the user clicking a button.

In response to the user action, the client machine 140 prompts the user 160 to enter federated login credentials and sends an access request 130 to the server machine 102. The access request 130 includes the login credentials of the user 160 and provides a request for the first key part, K1. In some examples, prior to issuing the access request 130, the browser extension 152a generates an asymmetric key pair, which includes a public key, Kpu, and a private key, Kpr. In such examples, the access request 130 sent to the server machine 102 includes the public key, Kpu, which the server machine 102 may use for encrypting K1. The browser extension 152a retains the private key, Kpr, for later use.

In some examples, the browser extension 152a opens the browser tab 152b, which is used as a container for communicating with the server machine 102. For example, the browser tab 152b provides a context for operating a SAML user agent, which communicates with the SAML IDP (e.g., ADFS) running on the server machine 102. In some examples, sending the access request 130 involves the browser tab 152b posting a SAML authentication request to the ADFS server running on the server machine 102.

The server machine 102 responds to the access request 130 by performing an authentication operation and sending an access response 132 back to the client machine 140. Authentication proceeds according to pre-established authentication rules, which may apply credentials of the user 160 and/or other authentication factors, the details of which are not critical to the invention. In some examples, where the server machine 102 has received Kpu, the server machine 102 encrypts K1 using Kpu and provides the encrypted version of K1, i.e., K1-E, in the access response 132. For instance, the server machine 102 provides the access response 132 as a SAML response, where K1-E is provided as auxiliary data in the SAML response.

The client machine 140 receives the access response 132 and checks whether the authentication operation succeeded. If so, the federated login operation continues; otherwise, federated login terminates and the password manager is not opened.

In cases where the client machine 140 receives K1-E, the client machine verifies that K1-E was encrypted using Kpu, e.g., by checking a digital signature or by attempting to decrypt K1-E using the private key, Kpr. Such decryption produces an error if K1-E was not encrypted by Kpu. If verification fails, meaning that K1-E was not encrypted by Kpu, federated login terminates, as hacking is suspected. If verification succeeds, federated login proceeds.

At this point, a major portion of federated login has been completed, as the IDP has successfully authenticated the user 160 and the client machine 140 has received K1-E (and has the private key for decrypting it). All that remains is to obtain the remaining key part(s). It is preferable, if not essential, however, to obtain such key part(s) in a way that protects them from exposure and preserves zero-knowledge principles.

In an example, federated login proceeds with the client machine 140 requesting a one-time token 134 from the second server machine 104. For example, the browser extension 152a directs the browser tab 152b to post the access response 132 (e.g., the SAML response) to the second server machine 104. The browser tab 152b does so and receives back the one-time token 134. The browser extension 152a receives the one-time token 134 and submits it in a request (not shown) to the second server machine 104. The second server machine 104 responds to the request by providing, in an encrypted communication (e.g., HTTPS), a data set 136, which includes K2. In some examples, the data set 136 also includes K1-E and an authentication session identifier (AuthSessionId), which identifies the authentication operation described above. Different authentication session identifiers are associated with different authentication operations.

At this point, the client machine 140 has both K1-E and K2. The browser extension 152a applies Kpr to decrypt K1-E, thereby recovering K1. If only two key parts are needed, then the client machine 140 has all it needs to reconstitute the master password 124. As three key parts are used in the instant example, however, federated login continues.

K3, as well as any additional key parts, may be obtained in any suitable way. In one example, the browser extension 152a generates a current hash value from K1 and K2, such as SHA256 (K1 XOR K2). Under normal circumstances (no hacking or corruption), the current hash value should be the same as the provisioned hash value (HASH) stored by the third server machine 106. The browser extension 154a sends the current hash value to the third server machine 106, which compares the current hash value with the provisioned hash value (HASH). If the two hash values match, federated login continues; otherwise, it terminates. In some examples, the third server machine 106 also contacts the second server machine 104 to confirm that the authentication session identifier returned to the client machine 140 matches the one stored in the second server machine 104. It may also confirm that the authentication operation was successful and that other information concerning the login (e.g., email address, company identifier) match expected values. If all values match, the third server machine 106 trusts the client machine 140 and returns K3, in an encrypted communication, to the browser extension 152a.

From here, the browser extension 152a has all three key parts and can combine them, according to some predetermined arrangement, to reconstitute the master password 124. For example, the browser extension 152a combines the key parts by XOR'ing them together, i.e., by computing K1 XOR K2 XOR K3.

In some examples, the browser extension 152a performs additional checks before accessing the password vault 110, by requesting that the third server machine 106 confirm with the second server machine 104 that the authentication session identifier as received by the client machine 140 matches the one stored in the second server machine 104. It may also confirm that the authentication operation was successful and that other information concerning the login (e.g., email address, company identifier) match expected values. These additional checks prevent a user whose federated login has been revoked from saving and replaying an old master password, as they require the authentication session to be current. If all values match, the third server machine releases the password vault 110, allowing the browser extension 152a to unlock the password vault 110 using the master password 124. For example, the password vault 110 may be configured to unlock when presented with a hashed version of the master password 124. In such cases, the browser extension 152a may hash the reconstituted master password 124 and send it to the third server machine 106, which returns the decrypted password vault.

Figure 2:
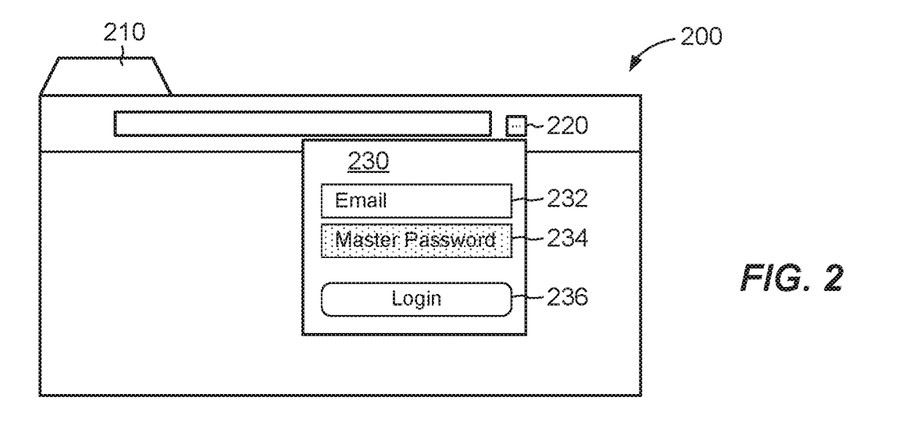
FIGS. 2-4 are diagrams showing screenshots of an example browser window during a federated login sequence for logging on to a password manager.
Figure 3:
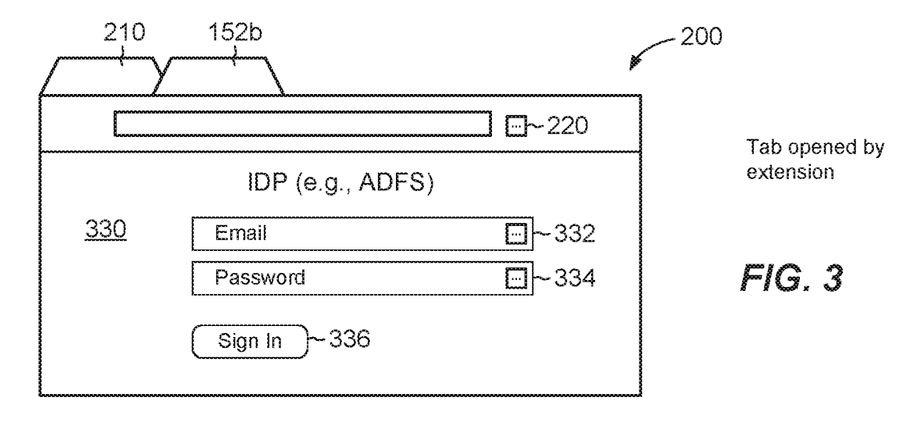
Figure 4:
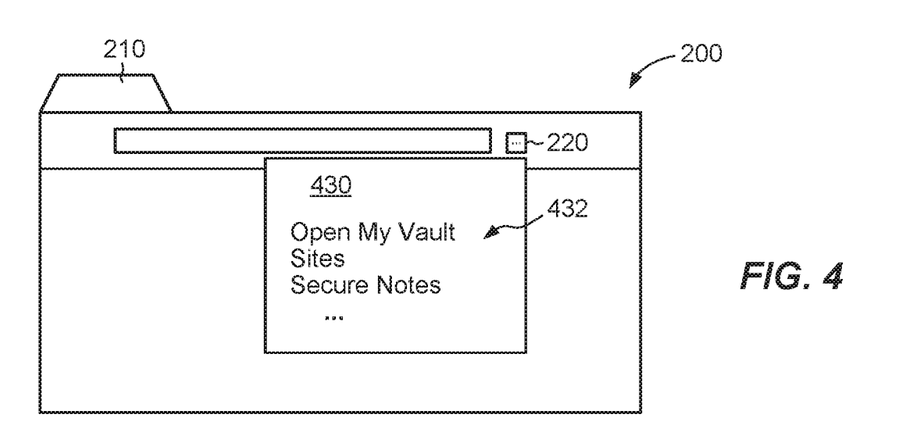

FIGS. 2-4 show example screenshots of a browser window 200 of the web browser 152 during respective steps of federated login. As shown in FIG. 2, the browser window 200 displays a browser tab 210. The browser window 200 also displays a control 220 for accessing the browser extension 152a. When a user clicks on the control 220, the browser extension 152a opens a window 230 for accessing a password manager. The window 230 displays, for example, an email field 232, a master password field 234, and a login button 236. In the case of a federated user, the master password field 234 may be disabled, as the user does not know the master password 124 (which was generated automatically) and cannot enter it. In an example, the user enters the user's email address into the email field 232 and clicks the login button 236. In response to the user clicking the login button 236, the browser tab 210 momentarily opens a web page served by the second server machine 104, which identifies the user as a federated user.

As shown in FIG. 3, in response to the second server machine 104 identifying the user as a federated user, the browser extension 152a outsources authentication for the password manager to the server machine 102, i.e., the IDP. The browser extension 152a opens the browser tab 152b that displays a web page 330 hosted by the IDP. The web page 330 includes fields 332 and 334 for receiving the user's federated login email address and password (and/or any other authentication factors). Once the user has entered these values, the user may click the Sign In button 336. In response to the user clicking the button 336, a sequence of actions is performed, invisibly to the user, to perform a federated authentication operation, which includes collecting the key parts K1, K2, and K3, reconstituting the master password of the user's password vault, and opening the password vault 110.

As shown in FIG. 4, federated login to the password manager has been successfully completed. Clicking the control 220 causes the browser extension 152a to display a window 430, which includes controls 432 for operating the password manager, including opening the password vault 110, accessing data in the password vault 110, or performing other actions requiring access to the password vault 110.

FIGS. 5A-5D show an example sequence of events for performing federated login to a password manager. The illustrated sequence involves operations among the browser extension 152a, the browser tab 152b, the IDP in the server machine 102, a custom attribute store (CAS) 102a running alongside the IDP on the server machine 102, the second server machine 104, and the third server machine 106. The sequence as shown assumes that the SAML protocol is used and that the IDP running on the server machine 102 is Microsoft ADFS. It also assumes that every verification step succeeds, such that federated login proceeds to a successful conclusion. The example sequence as shown is intended to be illustrative rather than limiting.

Figure 5A:
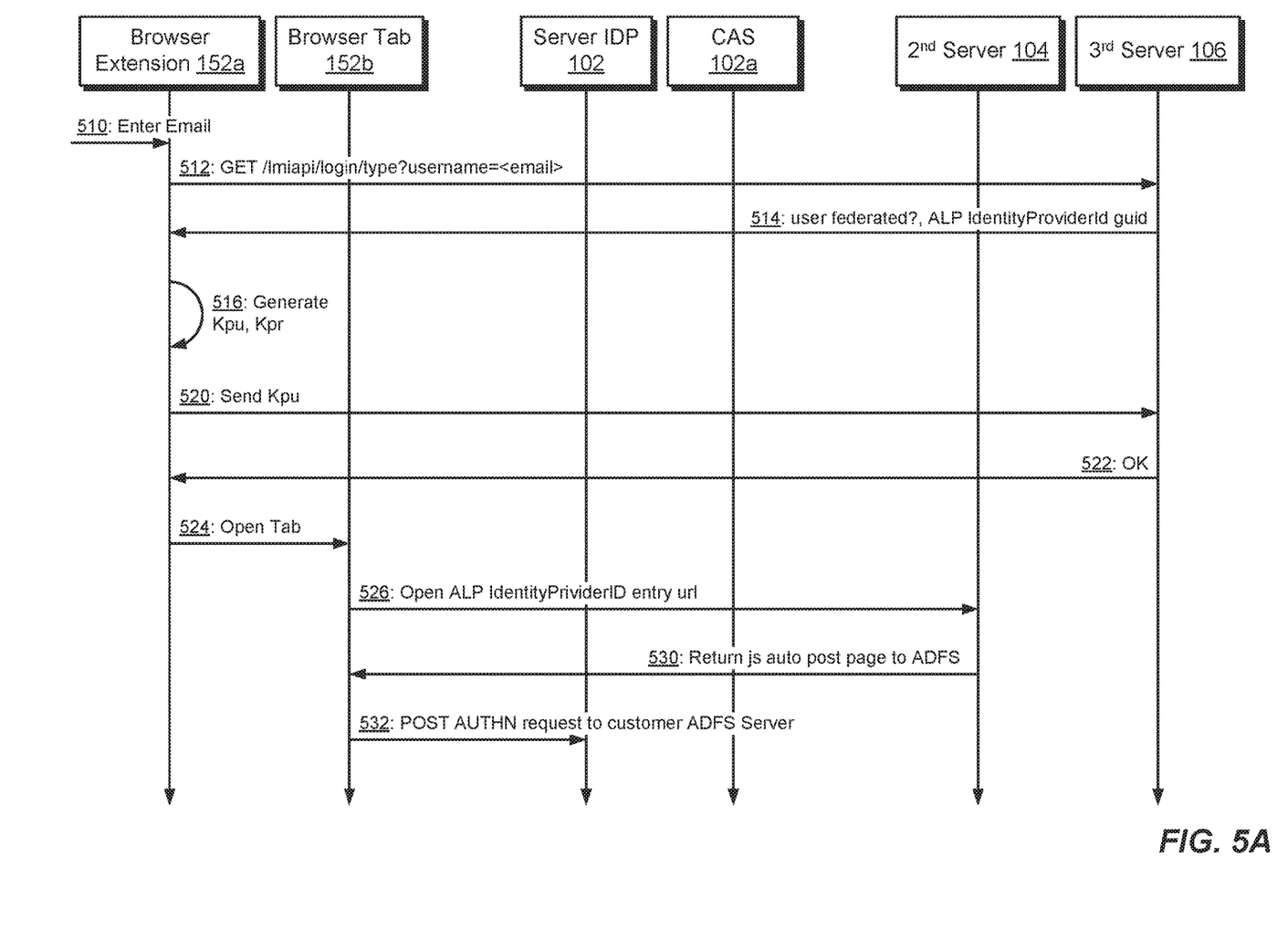
FIGS. 5A-5D are a sequence diagram showing a detailed example sequence of activities for performing federated login in accordance with certain embodiments of the invention.

Starting in FIG. 5A, operation begins at 510, wherein the user 106 enters the user's email address into the browser extension 152a, e.g., as shown in FIG. 2.

At 512, e.g., in response to the user 160 clicking the login button 236, the browser extension 152a sends a message (GET/lmiapi/login/type?username=<email>) to the third server machine 106.

At 514, the third server machine 106 responds by indicating whether the user is federated (the user is federated in this example), as well as by providing other information. Upon receiving the response at 514, the browser extension 152a proceeds with federated login.

In some examples, at 516, the browser extension 152a generates the asymmetric key pair Kpu, Kpr, and at 520 sends Kpu to the third server machine 106, which confirms receipt at 522.

At 524, the browser extension 152a opens the browser tab 152b which, at 526, requests a federated login page from the second server machine 104. At 530, the federated login page is returned to the browser tab 152b and displayed therein (see FIG. 3).

At 532, after the user has entered federated credentials (e.g., in fields 332 and 334 of FIG. 3) and has clicked the Sign In button 336, the browser tab 152b posts an authentication request (e.g., a SAML request) to the IDP running on the server machine 102.

Figure 5B:
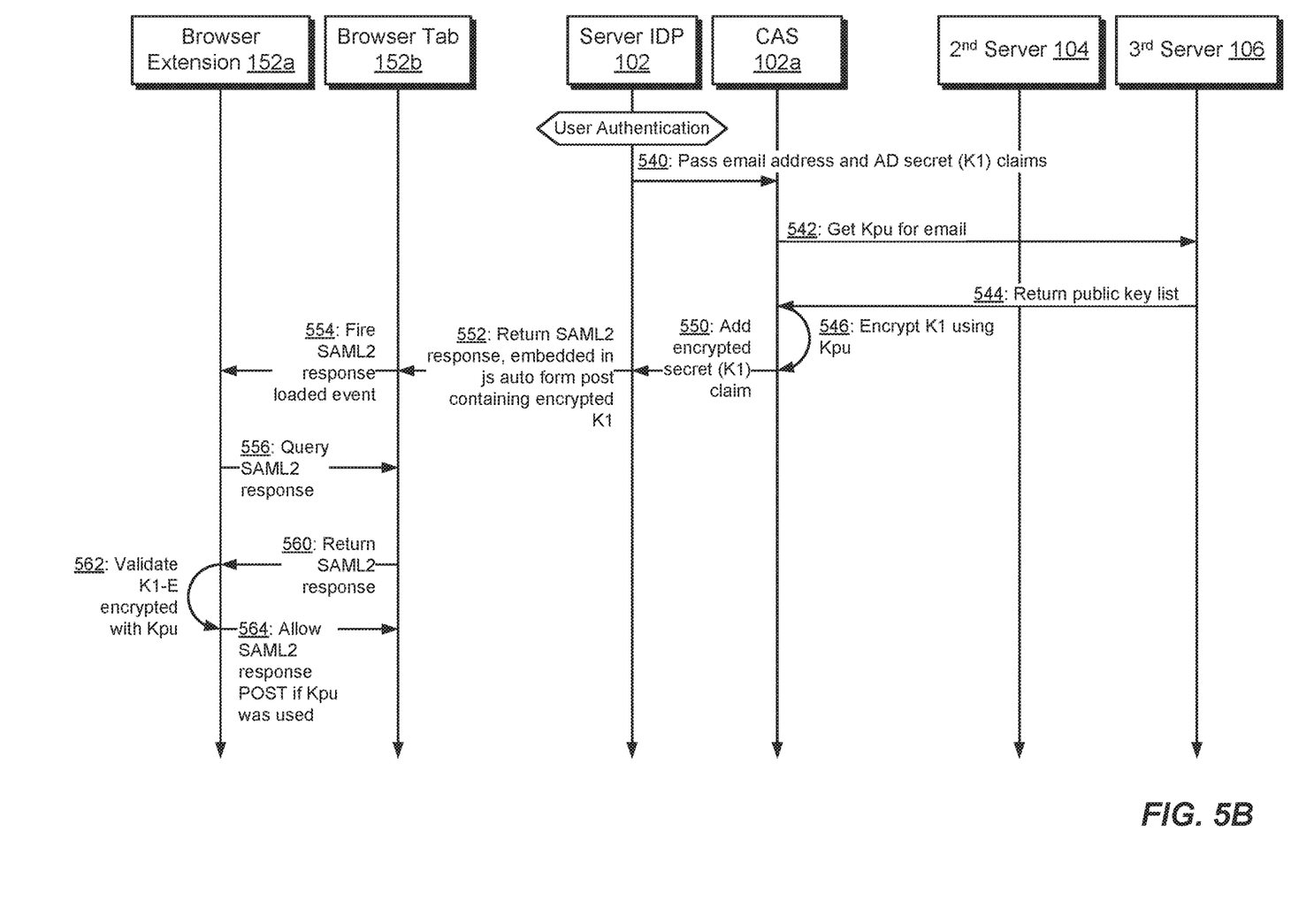

Turning now to FIG. 5B, user authentication by the IDP begins. At 540, the IDP passes the email address (from field 232 of FIG. 2) along with K1 to the CAS 102a, whose role it is to encrypt K1 using Kpu.

At 542, the CAS 102a requests Kpu for the current email address (user) from the third server machine 106, which received Kpu at 520.

At 544, the CAS 102a receives Kpu and, at 546, encrypts K1 using Kpu.

At 550, the CAS 102a sends K1-E to the IDP, with a request to add K1-E to a SAML claim.

At 552, the IDP returns a response (e.g., a SAML response) to the browser tab 152*b*. The SAML response in embedded in a JavaScript auto form post, which contains K1-E.

At 554, the browser tab 152*b* directs the browser extension 152*a* to fire a SAML response loaded event.

At 556, the browser extension 152*a* responds by querying the browser tab 152*b* for the SAML response.

At 560, the browser tab 152*b* returns the SAML response to the browser extension 152*a*.

At 562, the browser extension 152*a* obtains K1-E from the SAML response and performs a testing operation to confirm that K1-E was encrypted using Kpu (e.g., by checking a signature or by attempting to decrypt K1-E using Kpr and checking whether doing so generates an error).

Assuming that the testing operation at 562 succeeds, the browser extension 152*a* directs the browser tab 152*b*, at 564, to allow a SAML response post.

Figure 5C:
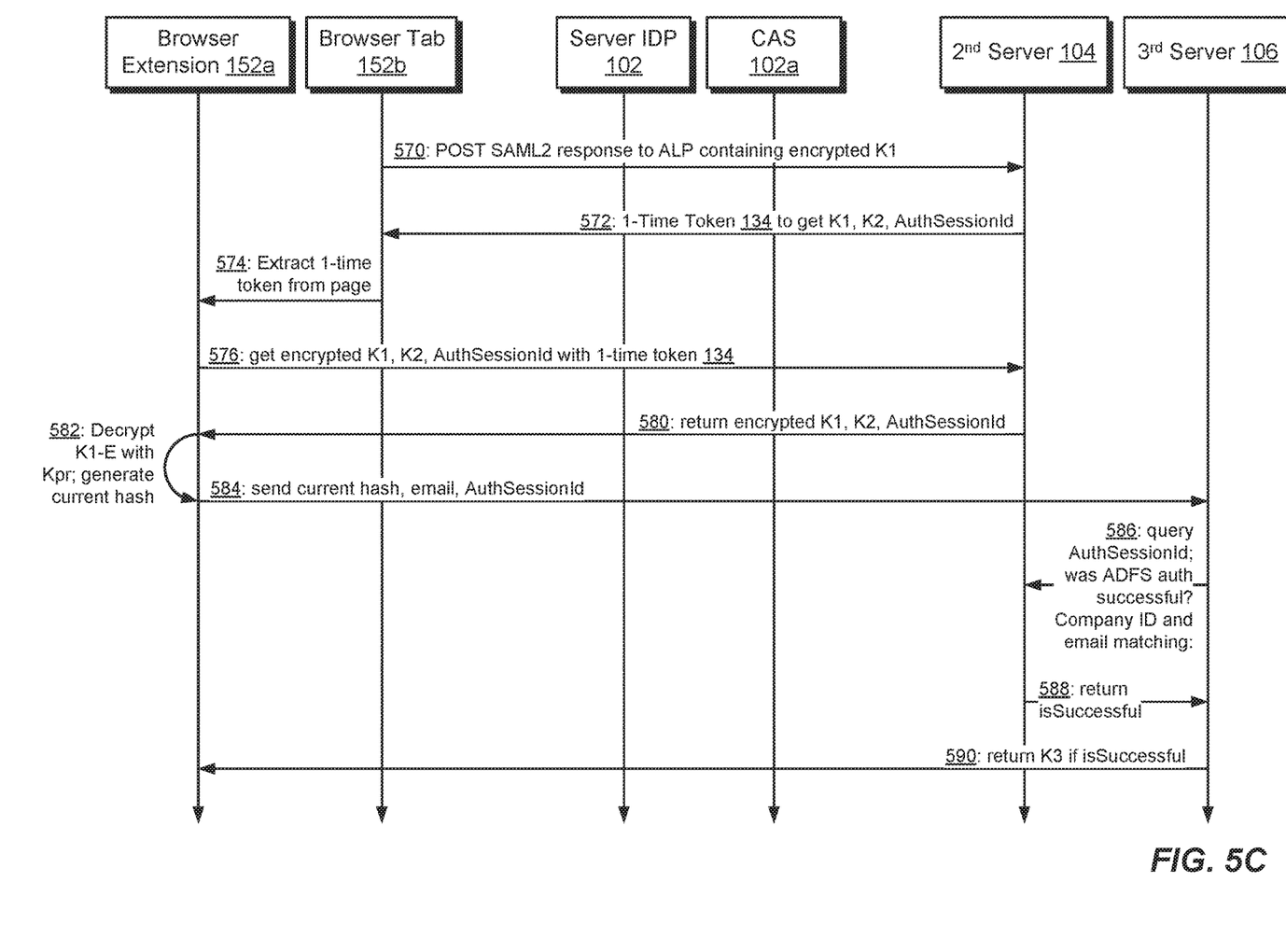

At 570, as shown in the continuing operations in FIG. 5C, the browser tab 152*b* posts the SAML response to the second server machine 104. The posted SAML response includes K1-E. The second server machine 104 interprets this post as an implicit request to generate the one-time token 134.

At 572, the second server machine 104 returns the one-time token 134 to the browser tab 152*b*, which extracts the one-time token 134 and provides it, at 574, to the browser extension 152*a*.

At 576, the browser extension 152*a* sends the one-time token 134 in a request to the second server machine 104 to obtain K2, K1-E, and the authentication session identifier, AuthSessionId.

At 580, the second server machine 104 verifies the one-time token 134 and returns the requested information to the browser extension 152*a* in an encrypted communication (e.g., HTTPS).

At 582, the browser extension 152*a* decrypts K1-E using Kpr and generates the current hash value, e.g., SHA256 (K1 XOR K2).

At 584, the browser extension 152*a* sends the current hash value, the email address, and AuthSessionId the third server machine 106, as part of a request for the third key part, K3.

At 586, the third server machine 106 contacts the second server machine 104 to confirm the AuthSessionId, to confirm that user authentication was successful, and to confirm that additional factors (e.g., company id and email) match expected values. The third server machine 106 may also request confirmation that the current hash value matches the provisioned hash value (HASH; see FIG. 1).

At 588, assuming all verifications succeed, the second server machine 104 returns a successful result to the third server machine 106, which at 590 returns K3 to the browser extension 152*a* in an encrypted communication.

Figure 5D:
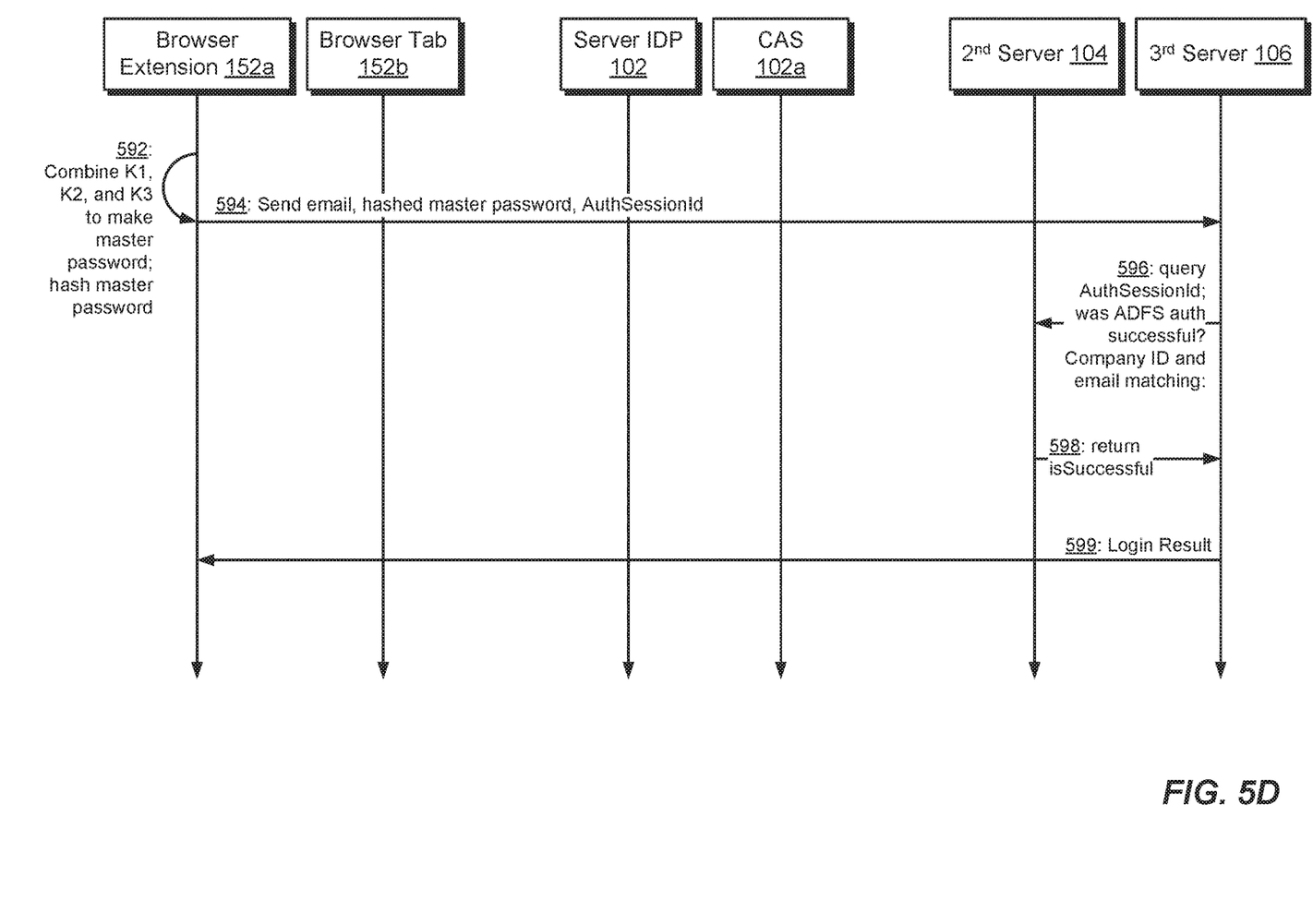

At 592, as shown in FIG. 5D, the browser extension 152 combines K1, K2, and K3 to reconstitute the master password 124, such as by computing K1 XOR K2 XOR K3. At this time, the browser extension 152*a* may also compute a hash of the master password. All that is left is to verify that the request for access to the password manager is current (e.g., to prove that this is not a replay event by a terminated user).

At 594, the browser extension 152*a* sends the email address, hashed master password, and AuthSessionId to the third server machine 106.

At 596, the third server machine 106 contacts the second server machine 104 to confirm the AuthSessionId, to confirm that user authentication was successful, and to confirm that additional factors (e.g., company id and email) match expected values.

At 598, assuming all verifications succeed, the second server machine 104 returns a successful result to the third server machine 106, which, at 599, returns a successful login result. Returning the successful login result may include providing the password vault in decrypted form.

At the conclusion of the acts shown in FIGS. 5A-5D, federated login to the password manager is complete and the browser 152 displays a screen like the one shown in FIG. 4. The user 160 may then access passwords and other secrets stored in the password vault.

Figure 6:
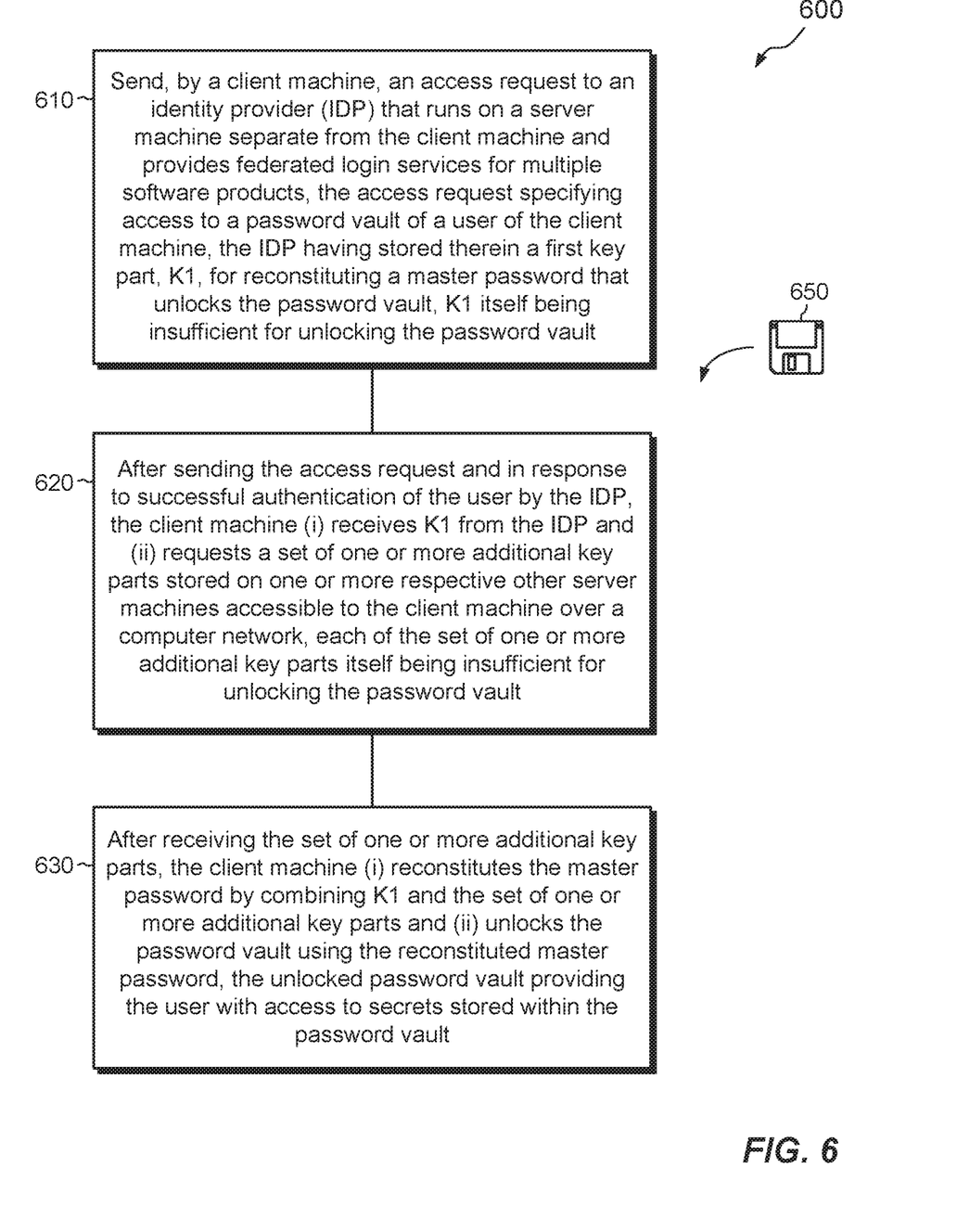
FIG. 6 is a flowchart showing an example method of managing federated login to a password vault.

FIG. 6 shows an example method 600 that may be carried out in connection with the environment 100. The method 600 is typically performed, for example, by the software constructs described in connection with FIG. 1, which reside in the memory 150 of the client machine 140 and are run by the set of processors 144. The various acts of method 600 may be ordered in any suitable way. Accordingly, embodiments may be constructed in which acts are performed in orders different from that illustrated, which may include performing some acts simultaneously.

At 610, the client machine 140 sends an access request 130 to an identity provider (IDP) that runs on a server machine 102 separate from the client machine 140 and provides federated login services for multiple software products. The access request 130 specifies access to a password vault 110 of a user of the client machine 140. The IDP has stored therein a first key part, K1, for reconstituting a master password 124 that unlocks the password vault 110. K1 itself is insufficient for unlocking the password vault 110.

At 620, after sending the access request 130 and in response to successful authentication of the user by the IDP, the client machine 140 (i) receives K1 from the IDP and (ii) requests a set of one or more additional key parts (e.g., K2 and K3) stored on one or more respective other server machines (e.g., 104 and 106) accessible to the client machine 140 over a computer network 130. Each of the set of one or more additional key parts itself is insufficient for unlocking the password vault 110.

At 630, after receiving the set of one or more additional key parts, the client machine 140 (i) reconstitutes the master password 124 by combining K1 and the set of one or more additional key parts and (ii) unlocks the password vault 110 using the reconstituted master password 124. The unlocked password vault provides the user with access to secrets stored within the password vault 110.

An improved technique has been described for providing federated login to a password vault 110. The technique generates a master password 124 for a federated user, renders the master password as multiple parts (e.g., K1, K2, and K3), and stores the key parts in separate entities. After successful authentication with an identity provider (IDP), a user's local machine 140 receives the password parts and combines them to recreate the master password 124. The local machine 140 then applies the master password 124 to decrypt the password vault 110.

With the improved technique, users enjoy the convenience of SSO, and administrators enjoy the ability to manage user access across an organization from a single location. The improved technique is also suitable for deployment over the Internet, without requiring VPNs.

Having described certain embodiments, numerous alternative embodiments or variations can be made. For example, although embodiments have been described for providing federated login to a password manager, similar embodiments may be used for providing federated login for other software products, particularly those requiring enhanced security. In addition, although the embodiments as shown and described involve the use of a web browser 152, alternative embodiments may employ other web technology, such as web frames embedded within apps or applications. In such embodiments, the IDP login may be displayed within a web frame, e.g., to provide the functionality of the web tab 152b, and the app (or application) may provide the functionality of the browser extension 152a. The use of web frames may be particularly suitable in cases where the client machine 140 is a mobile device, such as a smart phone, personal data assistant, tablet computer, or the like.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing federated login to a password vault, the method comprising:
   sending, by a client machine, an access request to an identity provider (IDP) that runs on a server machine separate from the client machine and provides federated login services for multiple software products, the access request specifying access to a password vault of a user of the client machine, the IDP having stored therein a first key part, K1, for reconstituting a master password that unlocks the password vault, K1 itself being insufficient for unlocking the password vault;
   after sending the access request and in response to successful authentication of the user by the IDP, the client machine (i) receiving K1 from the IDP, (ii) validating that K1 is encrypted using a key known to the client machine, and (iii) based on the validating of K1 succeeding, requesting a set of one or more additional key parts stored on one or more respective other server machines accessible to the client machine over a computer network, each of the set of one or more additional key parts itself being insufficient for unlocking the password vault; and
   after receiving the set of one or more additional key parts, the client machine (i) reconstituting the master password by combining K1 and the set of one or more additional key parts and (ii) unlocking the password vault using the reconstituted master password, the unlocked password vault providing the user with access to secrets stored within the password vault.

2. The method of claim 1, further comprising:
   prior to the client machine receiving K1, (i) generating, by the client machine, an asymmetrical key pair that includes a public key, Kpu, and a private key, Kpr, and (ii) providing Kpu to the IDP,
   wherein validating that K1 is encrypted using a key known to the client machine includes, after receiving K1 from the IDP and prior to requesting the set of one or more additional key parts, performing a testing operation to confirm that K1 as received by the client machine was encrypted by Kpu, and
   wherein the client machine is configured to (i) request the set of one or more additional key parts in response to the testing operation confirming that K1 as received by the client machine was encrypted by Kpu and (ii) fail the access request in response to the testing operation failing to confirm that K1 as received by the client machine was encrypted by Kpu.

3. The method of claim 2, wherein the set of one or more other server machines includes a second server machine that stores a second key part, K2, as one of the set of one or more additional key parts, and wherein requesting the set of one or more additional key parts includes:
   requesting, by the client machine, a one-time token from the second server machine; and
   in response to the client machine providing the one-time token to the second server machine, receiving, from the second server machine, a set of data including K2.

4. The method of claim 3, wherein the second server machine is configured as a SAML (Security Assertion Markup Language) service provider, the IDP is configured as a SAML identity provider, and the client machine is configured as a SAML user agent.

5. The method of claim 4 wherein, when sending the access request to the IDP, the access request includes a SAML request, and wherein the client machine, when receiving K1 from the IDP, receives a SAML response from the IDP in response to the SAML request, the SAML response including K1 as encrypted by Kpu.

6. The method of claim 5, wherein requesting the set of one or more additional key parts further includes:

when requesting the one-time token from the second server machine, providing, by the client machine, the SAML response to the second server machine, wherein receiving the set of data from the second server machine is based at least in part on the second server machine having successfully validated authenticity of the SAML response as received from the client machine, and wherein the set of data received from the second server machine further includes K1 as encrypted by Kpu.

7. The method of claim 6, wherein the second server machine also stores an authentication session identifier that identifies a login session associated with the SAML request, wherein the set of data received by the client machine further includes the authentication session identifier, and wherein the method further comprises:

prior to unlocking the password vault, verifying that a current version of the authentication session identifier as stored in the second server machine matches the authentication session identifier as received in the set of data.

8. The method of claim 6, wherein the set of one or more other server machines further includes a third server machine that stores a third key part, K3, as one of the set of one or more additional key parts, as well as a provisioned hash value derived from K1 and K2, and wherein the method further comprises:

decrypting, by the client machine, K1 using the private key, Kpr;

generating, by the client machine, a current hash value based on (i) K1 as decrypted by Kpr and (ii) K2 as received from the second server machine; and providing the current hash value to the third server machine, wherein requesting the set of one or more additional key parts further includes, in response to the third server machine verifying that the current hash value matches the provisioned hash value, receiving K3 by the client machine from the third server machine.

9. The method of claim 8, wherein the second server machine also stores an authentication session identifier that identifies a login session associated with the SAML request, wherein the set of data received by the client machine further includes the authentication session identifier, and wherein the method further comprises:

when providing the current hash value to the third server machine, the client machine also provides the authentication session identifier as received with the set of data to the third client machine, wherein receiving K3 from the third server machine takes place further in response to the third server machine confirming that the authentication session identifier as received by the third server machine matches a current authentication session identifier stored in the second server machine.

10. The method of claim 4, wherein the client machine runs a web browser that includes a browser tab that acts as the SAML user agent, wherein the browser is configured with a browser extension, and wherein the access request is sent to the IDP in response receiving a user request from the user by the browser extension.

11. The method of claim 4, further comprising, prior to sending the access request:

generating the master password;

splitting the master password into multiple key parts; and provisioning the IDP and each of the set of other server machines with a respective one of the multiple key parts, such that the IDP and each of the set of other server machines each have one of the key parts.

12. The method of claim 11, wherein the IDP and each of the set of other server machines form a plurality of servers, and wherein the method further comprises, prior to sending the access request:

providing each of the plurality of servers with an internet address of each other of the plurality of servers, to enable internet communication among the plurality of servers.

13. A client machine comprising control circuitry that includes a set of processing units coupled to memory, the control circuitry constructed and arranged to:

send, by a client machine, an access request to an identity provider (IDP) that runs on a server machine separate from the client machine and provides federated login services for multiple software products, the access request specifying access to a password vault of a user of the client machine, the IDP having stored therein a first key part, K1, for reconstituting a master password that unlocks the password vault, K1 itself being insufficient for unlocking the password vault;

after the access request is sent and in response to successful authentication of the user by the IDP, (i) receive K1 from the IDP, (ii) validate that K1 is encrypted using a key known to the client machine, and (iii) based on the validation of K1 being successful, request a set of one or more additional key parts stored on one or more respective other server machines accessible to the client machine over a computer network, each of the set of one or more additional key parts itself being insufficient for unlocking the password vault; and after receipt of the set of one or more additional key parts, (i) reconstitute the master password by combining K1 and the set of one or more additional key parts and (ii) unlock the password vault using the reconstituted master password, the unlocked password vault providing the user with access to secrets stored within the password vault.

14. A computer program product including a set of non-transitory, computer-readable media having instructions which, when executed by control circuitry, cause the control circuitry to perform a method of managing federated login to a password vault, the method comprising:

sending, by a client machine, an access request to an identity provider (IDP) that runs on a server machine separate from the client machine and provides federated login services for multiple software products, the access request specifying access to a password vault of a user of the client machine, the IDP having stored therein a first key part, K1, for reconstituting a master password that unlocks the password vault, K1 itself being insufficient for unlocking the password vault;

after sending the access request and in response to successful authentication of the user by the IDP, the client machine (i) receiving K1 from the IDP, (ii) validating that K1 is encrypted using a key known to the client machine, and (iii) based on the validating of K1 succeeding, requesting a set of one or more additional key parts stored on one or more respective other server machines accessible to the client machine over a computer network, each of the set of one or more additional key parts itself being insufficient for unlocking the password vault; and after receiving the set of one or more additional key parts, the client machine (i) reconstituting the master password by combining K1 and the set of one or more additional key parts and (ii) unlocking the password vault using the reconstituted master password, the unlocked password vault providing the user with access to secrets stored within the password vault.

15. The computer program product of claim 14, wherein the method further comprises:
   prior to the client machine receiving K1, (i) generating, by the client machine, an asymmetrical key pair that includes a public key, Kpu, and a private key, Kpr, and (ii) providing Kpu to the IDP,
   wherein validating that K1 is encrypted using a key known to the client machine includes, after receiving K1 from the IDP and prior to requesting the set of one or more additional key parts, performing a testing operation to confirm that K1 as received by the client machine was encrypted by Kpu, and
   wherein the client machine is configured to (i) request the set of one or more additional key parts in response to the testing operation confirming that K1 as received by the client machine was encrypted by Kpu and (ii) fail the access request in response to the testing operation failing to confirm that K1 as received by the client machine was encrypted by Kpu.

16. The computer program product of claim 15, wherein the set of one or more other server machines includes a second server machine that stores a second key part, K2, as one of the set of one or more additional key parts, and wherein requesting the set of one or more additional key parts includes:
   requesting, by the client machine, a one-time token from the second server machine; and
   in response to the client machine providing the one-time token to the second server machine, receiving, from the second server machine, a set of data including K2.

17. The computer program product of claim 16, wherein the second server machine is configured as a SAML (Security Assertion Markup La nguage) service provider, the IDP is configured as a SAML identity provider, and the client machine is configured as a SAML user agent.

18. The computer program product of claim 17 wherein, when sending the access request to the IDP, the access request includes a SAML request, and wherein the client machine, when receiving K1 from the IDP, receives a SAML response from the IDP in response to the SAML request, the SAML response including K1 as encrypted by Kpu.

19. The computer program product of claim 18, wherein requesting the set of one or more additional key parts further includes:
   when requesting the one-time token from the second server machine, providing, by the client machine, the SAML response to the second server machine,
   wherein receiving the set of data from the second server machine is based at least in part on the second server machine having successfully validated authenticity of the SAML response as received from the client machine, and
   wherein the set of data received from the second server machine further includes K1 as encrypted by Kpu.

20. The computer program product of claim 19, wherein the second server machine also stores an authentication session identifier that identifies a login session associated with the SAML request, wherein the set of data received by the client machine further includes the authentication session identifier, and wherein the method further comprises:
   prior to unlocking the password vault, verifying that a current version of the authentication session identifier as stored in the second server machine matches the authentication session identifier as received in the set of data.

* * * * *